United States Patent [19]

Kwiatkowski

[11] 4,024,524
[45] May 17, 1977

[54] SINGLE WEB EDGE CONTACTING DETECTING APPARATUS

[75] Inventor: J. A. Kwiatkowski, Muncie, Ind.
[73] Assignee: Ball Corporation, Muncie, Ind.
[22] Filed: June 17, 1975
[21] Appl. No.: 587,667
[52] U.S. Cl. .............................. 340/259; 242/186
[51] Int. Cl.² ...................................... G08B 21/00
[58] Field of Search ............ 340/259; 226/23, 15, 226/16; 271/227, 258; 242/57.1, 186

[56] References Cited
UNITED STATES PATENTS

| | | | |
|---|---|---|---|
| 1,680,690 | 8/1928 | Murphy | 340/259 |
| 2,636,692 | 4/1953 | Picking | 242/57.1 |
| 2,848,815 | 8/1958 | Scheu | 340/259 |
| 3,100,889 | 8/1963 | Cannon | 340/259 |
| 3,504,835 | 4/1970 | Callan | 226/23 |
| 3,564,530 | 2/1971 | Kroeck et al. | 340/259 |
| 3,750,920 | 8/1973 | Fountain et al. | 226/23 |
| 3,908,881 | 9/1975 | McCann | 226/23 |

*Primary Examiner*—Glen R. Swan, III
*Attorney, Agent, or Firm*—Gilbert E. Alberding

[57] ABSTRACT

A linearly slidable sensing member having a tungsten carbide tip is operatively connected to a linear variable differential transformer (LVDT), and mounted on an adjustable bracket so that it is in continuous contact with an edge of a web. A d.c. electrical signal of a given voltage is generated by the LVDT depending upon the position of the sensing member with respect to a point that is stationary relative to the machine. The signal is compared to a reference d.c. voltage by a pair of differential voltage comparators, and depending upon the voltage of the signal relative to predetermined adjusted reference voltage levels one of three indicating lights is energized. Apparatus for energizing the lights may include switching amplifiers connected to each output of the differential voltage comparators, a triple exclusive OR gate, and a transistor connected to the output of each gate of the triple exclusive OR gate.

14 Claims, 4 Drawing Figures

SINGLE WEB EDGE CONTACTING DETECTING APPARATUS

BACKGROUND AND SUMMARY OF THE INVENTION

The invention relates generally to apparatus for determining and indicating the position of an edge of a web that is to be acted on by a machine. In particular, the invention relates to the sensing of an edge of a metal web feeding a die-cutter which cuts the web into sheets to be used in making metal cans. It has been found that when a web edge is wrinkled or otherwise distorted the web can jump out of the roller guides that are used to position the web before it is cut. According to the present invention, variations in edge configuration over a predetermined amount are visually indicated to the operator of the die-cutting machine and/or the machine is automatically stopped so as to prevent damage thereto in the event the web does jump out from the roller guides.

According to the present invention, a physical sensing means having a tip of hard material is biased into engagement with an edge of a web feeding a machine for acting on the web. The physical sensing means is operatively connected to a linear variable differential transformer (LVDT) in a bracket specially adapted for holding the sensing means and the LVDT. The bracket ensures that no side forces will be exerted upon the LVDT, but rather only the linear translation of the sensing means will have an effect thereon. The LVDT generates an electrical signal in response to the relative position of the sensing means, and the electrical signal varies in magnitude in dependence upon the position of the sensing means relative to a fixed point on the machine, the bracket being operatively connected to the machine. Adjustment of the position of the sensing means is provided by the bracket.

Visual indication of the web's position is provided by three indicating lights, an "O.K." light indicating that the web is properly positioned, a "short" light indicating that the web edge is too far from the roller guides, and a "long" light indicating that the web edge is too close to the roller guides. The visual indication provided by these lights is initiated by circuitry connected to the LVDT. The d.c. signal generated by the LVDT is compared to a reference voltage by differential comparators. These comparators are connected in series to switching amplifiers (transistors) which drive a triple exclusive OR gate. Each gate of the triple exclusive OR gate is in turn connected in series with a transistor that drives one of the three indicating lamps, and optionally also drives a light emitting diode corresponding to the indicating lamp, and/or other indicating or shut-off means. Potentiometers connected between the differential comparators and the LVDT provide for adjustment of the relative positions of the web edge at which the lights will be lit. In this way, only one light can be lit at a time and such lights are lit only when the edge of the web has a particular position relative to the reference point on the machine.

While in the past there have been many proposals for sensing various conditions of webs being fed to machines, none have provided positive means for allowing physical adjustment and only linear movement of sensing means associated with a LVDT, nor for providing visual indication of which of three positions a web is in with respect to a reference point on the machine, nor the particular means and method according to the invention. For instance, U.S. Pat. No. 3,100,889 shows a pair of LVDTs responsive to opposite edges of a web for indicating the width of the web. While such means are generally useful, they do not sense the position of the web with respect to a fixed point on the machine being fed, do not provide means for eliminating side forces on the LVDTs, and require two LVDTs instead of one. Also, since a.c. is used therewith, integrating means must be employed, making the device relatively complicated as compared to the present invention. U.S. Pat. No. 2,651,031 shows the position of edge portions of a web with respect to fixed portions of a machine, however does not provide for visual indications of the web in three positions thereof, and requires that the web be conductive. U.S. Pat. Nos. 3,278,838, 3,147,574, 3,519,922 and 2,896,198 provide various other means for sensing various physical properties of a web, however none of these means have the particular features or advantageous results according to the method and apparatus of the present invention.

It is the primary object of the present invention to provide a simple effective apparatus for positively sensing and indicating the relative position of an edge of a web being fed to a machine for acting thereon. This and other objects of the invention will become clear from an inspection of the detailed description of the invention, and from the appended claims.

DETAILED DESCRIPTION OF THE DRAWINGS

Figure 1:
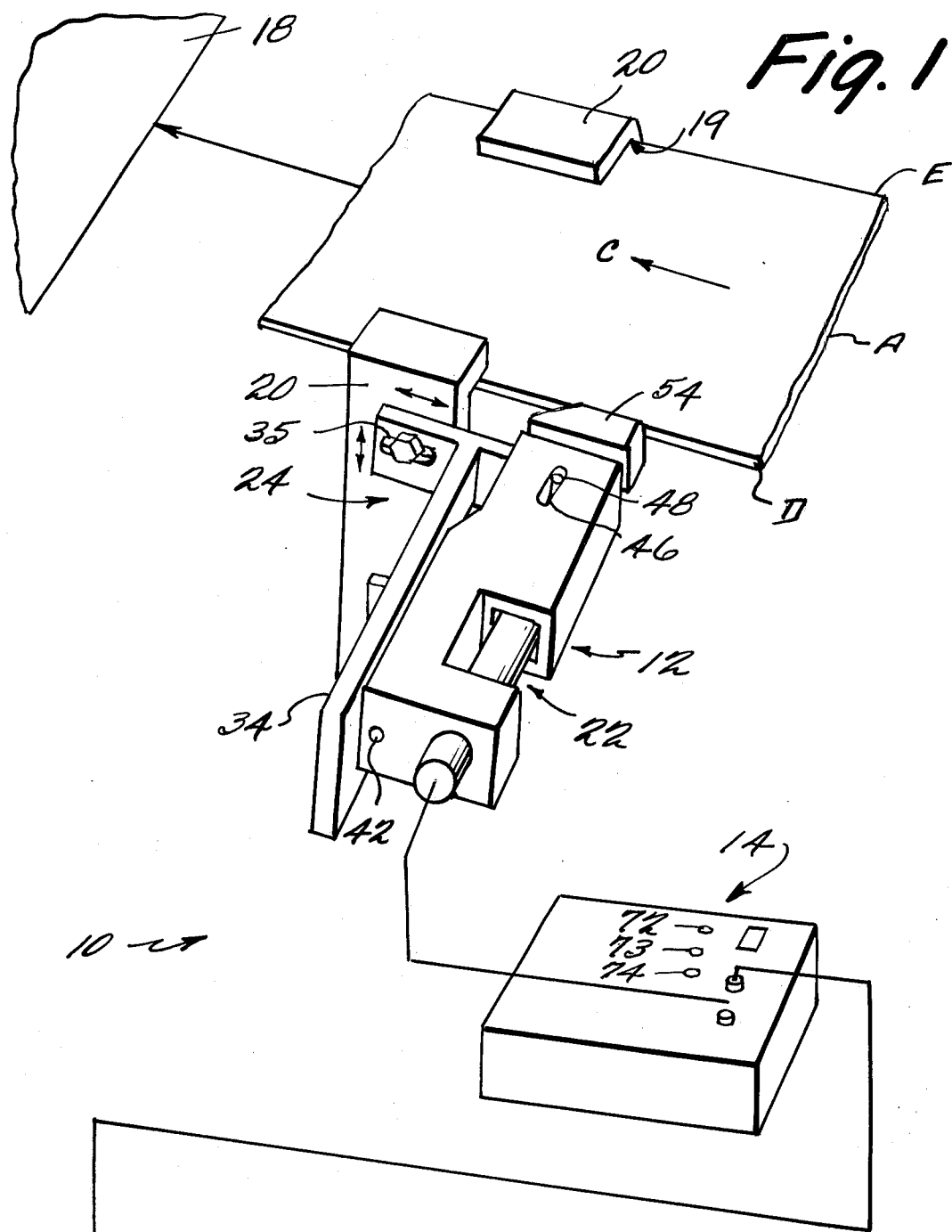
FIG. 1 is a perspective view of exemplary apparatus according to the present invention in operative relationship with a moving web, the position of which is being sensed.

Apparatus for sensing and indicating the edge position of a metallic web A according to the present invention is shown generally at 10 in FIG. 1. The apparatus consists of three major components, a sensing assembly 12 including a linear variable differential transformer (LVDT) 22 and mounting assembly 24 therefor, circuitry means 14 for driving particular indicating means in response to the web edge position as sensed by the assembly 12, and a remote indicating assembly 16. The assembly 12 is shown in more detail in FIGS. 2 and 3 while the circuitry 14 is shown schematically in FIG. 4 in operative relationship with the means 12 and 16.

A web A of metallic material or the like is fed in direction C through roller guides 19 to a machine 18 for acting thereon. The machine 18 may be any conventional machine for acting upon a web that must have an edge (or the edges) thereof in a particular position relative to the machine, such as a Littell die-cutter for cutting the web A into sheets to be made into cans. Guides 20 or the like containing roller guides 19 are stationary with respect to the machine 18, and operatively associated therewith, and may be used as a reference point for determining the relative position of the web A edge(s) with respect to the machine.

Assembly 12

Figure 2:
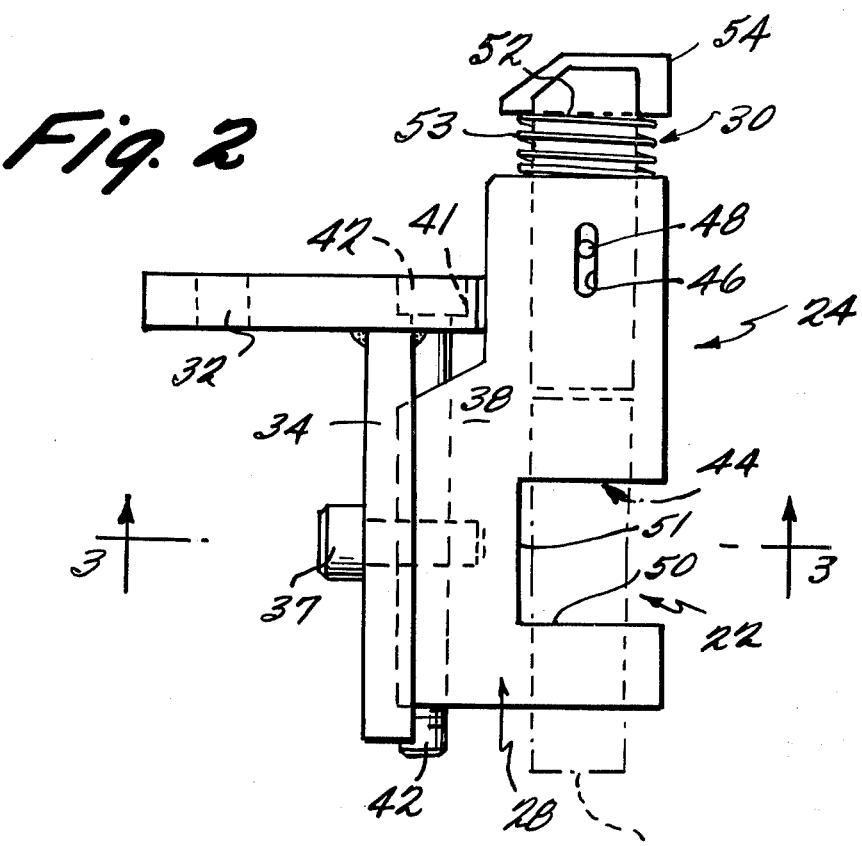
FIG. 2 is a side view of exemplary sensing apparatus and a mounting assembly therefor according to the present invention.
Figure 3:
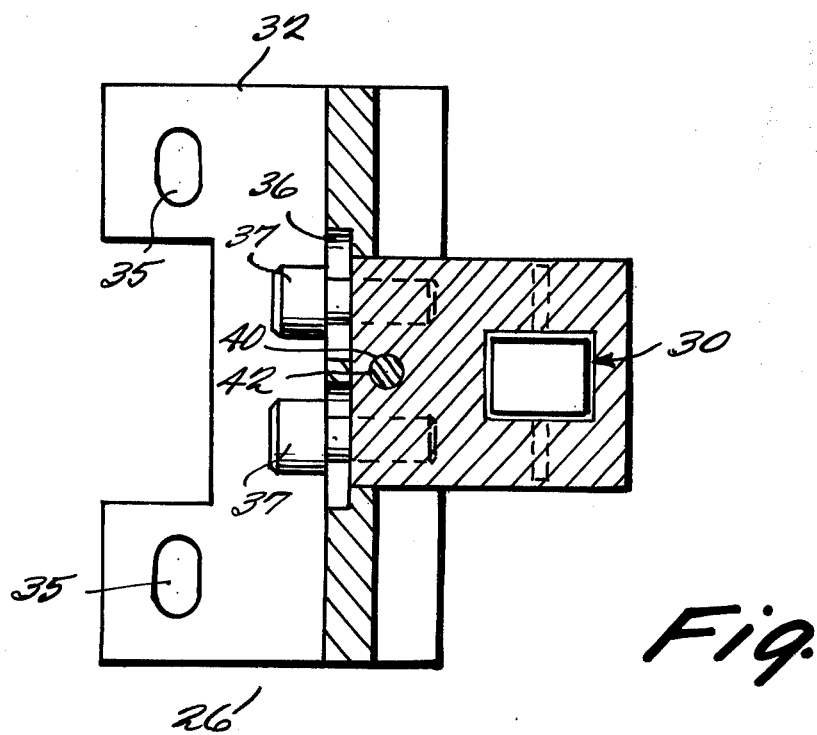
FIG. 3 is a partial sectional view of the apparatus of FIG. 2 taken along lines 3—3 of FIG. 2, showing some parts in elevation.

The sensing assembly 12, as best shown in FIGS. 2 and 3, comprises an LVDT 22 and operating and mounting assembly 24 therefor. The assembly 24 includes a means 30 for physically contacting an edge D of the web A, a main body portion 28 including first mounting means 44, 46 for mounting the sensing means 30 for only straight line movement in a direction generally perpendicular thereto, and second mounting means 50 for mounting the LVDT 22 so that it is not subject to side forces but so that it is responsive to the linear movement of the edge contacting means 30, and a third mounting means 26 for mounting the body 28 to the stationary reference 20 for machine 18. The means 26 may be L-shaped and may include a first leg 32 adapted to be placed in engagement with means 20 and having elongated holes 35 therein for adjustable receipt of bolts (not shown) for attaching the leg 32 to the means 20, a second leg 34 adapted to be connected to guide portion 38 of body 28 by screws 37 which pass through elongated openings 36 in leg 34, and a guide pin 42 passing through an opening 41 in leg 32.

Body 28 includes guide portion 38 having a bore 40 therethrough for receipt of the pin 42. Movement of the body 28 with respect to the means 26 is provided by guide pin 42, the body 28 sliding thereon. The relative position between the body 28 and means 26 may be fixed by tightening of screws 37. When screws 37 are loosened, the body 28 can be moved to a desired predetermined position with respect to the means 26 within the limits of the length of the openings 36, and then may be retained in that position by tightening of the screws 37.

The sensing means 30 merely comprises a body portion 52 adapted to be received within bore 44 in body 28, a pin 48 adapted to be received by the opening 46 in body 28 and affixed to the sensing means body portion 52, and a tip portion 54 for actually physically contacting the edge of the web A to be sensed. The tip portion 54 preferably is of a hard wear-resistant material such as tungsten carbide or the like. The first mounting means, bore 44 and slot 46, provide for linear movement of the means 30 in a direction generally perpendicular to the direction of movement C of the web A. A spring 53 or the like is provided for biasing the tip 54 into contact with the edge of web A, or other suitable biasing means could be provided, such as self-biasing means inherent in LVDT 22. The second mounting means for mounting the LVDT 22 so that it is responsive to the movement of means 30 but is not subject to side forces includes opening 50 and cutout 51 in body 28, and a portion of the LVDT 22 will also be received by bore 44. The core of LVDT 22 may be operatively connected to means 30 by any suitable conventional means.

It will be appreciated that by utilizing an assembly 12 as shown and described, the LVDT is subjected only to a straight-line force and not any side forces, is positively and adjustably mounted in position, and sensing of the position of an edge of web A relative to a stationary reference 20 associated with machine 18 is provided. The assembly is simple, effective, and easy to manufacture, install, and adjust.

While only one assembly 12 has been shown, it is to be understood that another assembly 12 may be provided for the edge E of web B if desired, however, in each case each assembly 12 will sense the position of the respective edge to stationary reference point of the machine 18.

Circuitry 14

Figure 4:
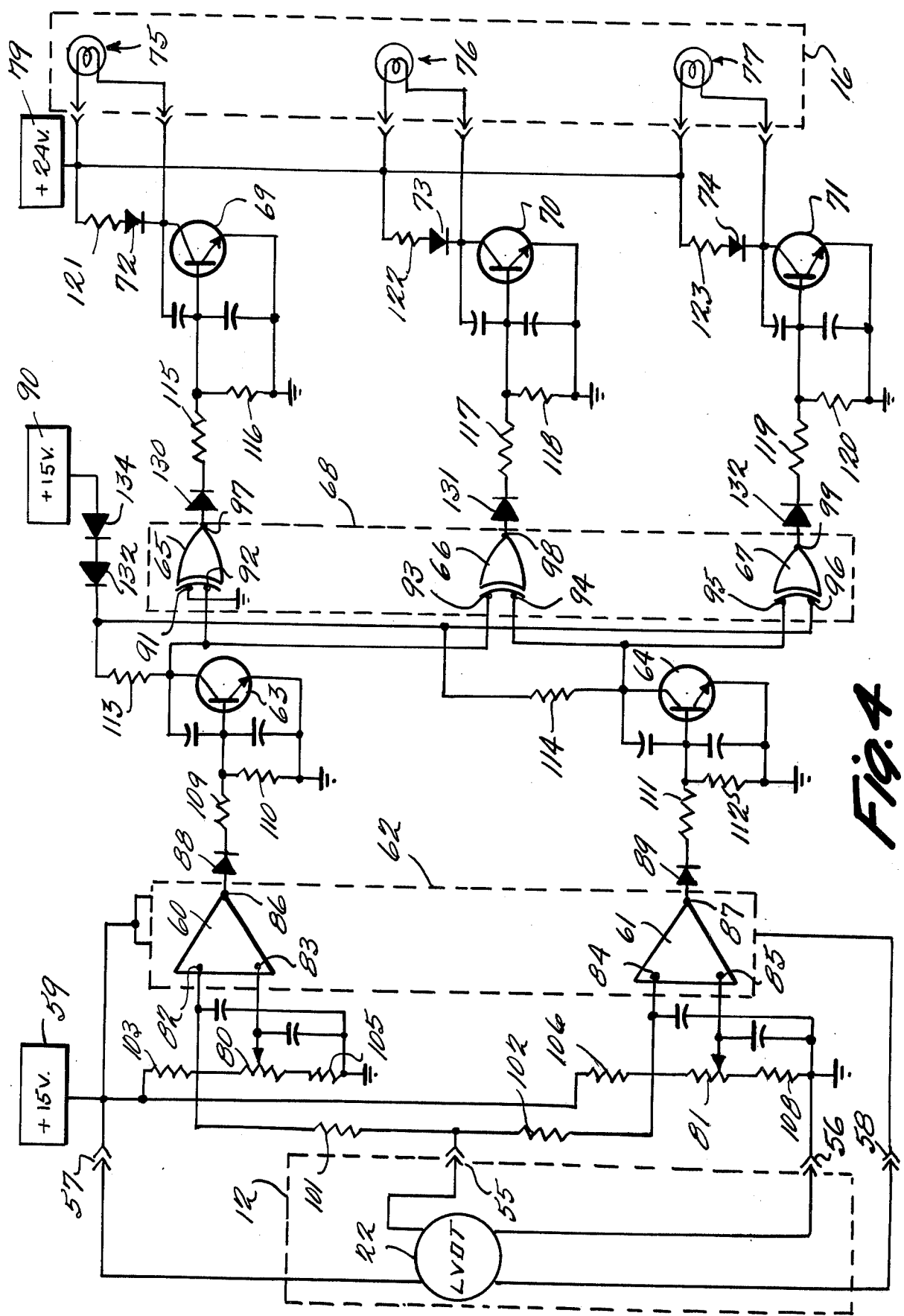
FIG. 4 is a schematic diagram, partly in block form, showing exemplary circuitry according to the present invention.

As seen in FIG. 4, the LVDT 22, which may be Schaevitz Eng. Model No. GCD-121-050 or the like, is operatively connected to the circuitry 14, as by a plurality of detachable connectors 55, 56, 57 and 58. The LVDT d.c. signal is transmitted to two differential comparators, 60, 61, which may be provided in a common integrated circuit package 62, such as Motorola MC1458G operational amplifier. The differential comparators 60, 61 compare the voltage of the signal generated by the LVDT 22 to a d.c. reference voltage provided by constant voltage source 59 (i.e., 15 v). The comparators 60, 61 are connected in series to switching amplifiers or transistors 63, 64 respectively, which provide the drive for a triple exclusive OR gate 68, including gates 65, 66, and 67. The common integrated circuit package 68 may be a CD4030AE triple exclusive OR gate, or other suitable component. Constant voltage e.m.f. source 90 (i.e. 15 v) is operatively connected to the transistors 63, 64 and various pins of the gates 65, 66, and 67. The gates 65, 66 and 67 are in turn connected in series with the transistors 69, 70, and 71 respectively, which transistors provide the drive for indicator lamps 75, 76, and 77 respectively of indicating assembly 16, and optionally provide the drive for light emitting diodes 72, 73 and 74 respectively. Constant voltage e.m.f. source 79 (i.e. 24 v) is connected to transistors 69, 70, and 71 for selective operation of the lights 75, 76, 77.

In order to provide for fine adjustment of the physical variations of the web A edge that will be allowed within the range of each indicating light 75, 76, 77 potentiometers 80 and 81 are provided. These potentiometers are connected through resistors 103 and 106 respectively to the source 59, and to pins 83 and 85 respectively of differential comparators 60, 61. LVDT 22 is connected through resistors 101 and 102 respectively to pins 82 and 84 of comparators 60, 61. Outputs 86 and 87 of comparators 60, 61 respectively are connected through diodes 88, 89 (which diodes are blocking diodes and are necessary since such outputs may go negative) to transistors 63 and 64. Input 91 of gate 65 is connected to ground (and thus will always be low), while input 92 is connected in parallel with transistor 63 to source 90. Input 93 of gate 66 is connected in parallel with transistor 63 to source 90, and input 94 of gate 66 is connected in parallel with transistor 64 to source 90. Input 95 of gate 67 is connected in parallel with transistor 64 to source 90, and input 96 of gate 67 is always connected to source 90 (and thus will always be high). Outputs 97, 98, 99 of gates 65, 66, and 67 respectively are connected in series, through diodes 130, 131, 132 respectively, to transistors 69, 70, and 71 respectively which diodes are provided to insure that the transistors 69, 70, and 71 turn off when the outputs 97, 98, 99 go low (with the diodes 130, 131, and 132, the low level of triple exclusive OR gate 68 can be as much as 1.4 volts and transistors 69, 70, and 71 will still be off). Truth tables for the comparators 62 and triple exclusive OR gate 68 are as follows:

| | Inputs | | | Outputs | | Switch | Amp. |
|---|---|---|---|---|---|---|---|
| 82 | 83 | 84 | 85 | 86 | 87 | 63 | 64 |
| $<V_{R80}$ | $V_{R80}$ | $<V_{R81}$ | $V_{R81}$ | 0 | 0 | 1 | 1 |
| $>V_{R80}$ | $V_{R80}$ | $<V_{R81}$ | $V_{R81}$ | 1 | 0 | 0 | 1 |
| $>V_{R80}$ | $V_{R80}$ | $>V_{R81}$ | $V_{R81}$ | 1 | 1 | 0 | 0 |

| | | Inputs | | | | | Outputs | | Lamp drivers | | | |
|---|---|---|---|---|---|---|---|---|---|---|---|---|
| 91 | 92 | 93 | 94 | 95 | 96 | 97 | 98 | 99 | 69 | 70 | 71 | Lamps "on" |
| 0 | 1 | 1 | 1 | 1 | 1 | 1 | 0 | 0 | 0 | 1 | 1 | 75 ("short") |
| 0 | 0 | 0 | 1 | 1 | 1 | 0 | 1 | 0 | 1 | 0 | 1 | 76 ("O.K.") |
| 0 | 0 | 0 | 0 | 0 | 1 | 0 | 0 | 1 | 1 | 1 | 0 | 77 ("long") |

Remote Indicating Assembly

The remote indicating assembly contains three light bulbs 75, 76, and 77 operatively connected to the circuitry 14. While in FIG. 4 the lamps have been shown connected to the same source as the transistors 69, 70, and 71, they may be connected instead to another power source, and the circuitry connections to the transistors 69, 70, and 71 modified accordingly. The lamps 75, 76, and 77 may be of any suitable type although it is perferred that they be push-to-test lamps, Microswitch PTL4156, or the like, having lenses of different color. The assembly 16 is located in a position for convenient viewing by the operator of the machine 18, as adjacent the controls of the machine 18.

Operation

Operation of the apparatus according to the invention is as follows: The tip 54 of sensing means 30 is placed in engagement with the edge of web A, as assembly 12 is mounted to stationary reference 20. LVDT 22 is operatively connected to means 30, and the relative position of the body 28 and leg 34 are adjusted to provide for proper engagement of the sensing means 30 relative to machine 18. Potentiometers 80 and 81 are then set at predetermined voltages which correspond to particular relative positions of the sensing means 30 (and thus the edge D of web A) and the reference 20, for instance 80 is set to trip at +2 v ($V_{R80}$ = +2 v) and 81 at +6 v ($V_{R81}$ = +6 v) which corresponds to ±0.010 inch movement of sensing means 30 (and thus location of edge D) from a middle reference. If the displacement of the sensing means 30 is such that the signal generated by LVDT 22 is less than +2 v, then 82 goes low, 86 goes low, transistor 63 is turned off, 92 goes high, 97 goes high, driver 69 is on, and therefore the short light 75 lights up. Since 87 is low, 98 and 99 are low and neither of the lights 76 or 77 will be on. If the displacement of the sensing means 30 changes in response to the web edge D position so that the signal generated by LVDT 22 is greater than +2 v but less than +6 v, then 82 goes high, 86 goes high, transistor 63 is turned on, 92 goes low, 97 is low which means light 75 is off; 93 is low, however 94 stays high since 87 is low and transistor 64 is turned off. With 93 low and 94 high, drive 70 is on and the O.K. light 76 lights up. Since 99 is low, light 77 will not be on. If the displacement of the sensing means 30 again changes in response to the web A edge position so that the signal generated by LVDT 22 is greater than +6 v, then 82 and 84 are both high, 86 and 87 are both turning on transistors 63 and 64; and 91, 93, 94, and 95 are made low by transistors 63 and 64 being "on" (91 already being low since it is connected to ground and 96 remaining high since it is directly connected to source 90), 99 is high, and therefore driver 71 is on and turns on long lamp 77. Since 97 and 98 are low, lights 75 and 76 will not be lit. Light emitting diodes 72, 73, and 74 are on when lamps 75, 76, and 77 respectively are on.

According to the exemplary embodiment of the invention described in operation above it is desirable for the components to be of the following type and have the following ratings by way of non limiting example:
Sources 59 and 90, +15 v, source 79 +24 v.
Resistors 101, 102, 103, 105, 106, and 108 are metal film resistors of resistances 15K, 100K, 100K, 101K, 100K, and 56K respectively.
Resistors 109–120 are composition resistors, 109, 111, 115, 117, and 119 being 2.2K, 110, 112, 116, 118, and 120 being 6.8K, and 113, 114 being 10K.
Potentiometers 80, 81 are Bourns, Model No. 3009P, 80 being 10K, 81 being 20K.
Diodes 88, 89, 130, 131, and 132 are model IN4148, and diodes 133, 134 are model No. IN4004.
Light emitting diodes are Fairchild FLV-101.
The capacitors, which are all used for noise filtering, are Sprague Ceramic. 0.1 mF — 20% 50 volt, Type - 3C023104X0500C5.

Method of Operation

It will be seen that according to the present operational method, sensing and indicating of the edge position of a web having a pair of side edges and being fed to a machine for acting thereon is provided, the method comprising the steps of establishing a path of movement of the web to the machine for acting thereon, continuously physically contacting one edge of the web to sense the physical position of the edge of the web relative to a reference point that is stationary with respect to the machine, transforming the physical position sensing of the web to a direct current electrical signal of a given voltage, the voltage of the signal being dependent upon the relative position of the sensed web edge and the stationary reference point, comparing the voltage of the electrical signal produced to a reference d.c. voltage, and energizing one of three indicating means for visually indicating the position of the sensed web edge relative to the stationary reference point.

In addition to the above steps, other steps may be taken responsive to the electrical signal generated in response to the edge position of the web; for instance the machine could be turned off, or other accessory means could be actuated to insure that the web does not jump out of the roller guides of the machine, or other indicating means (such as an audio signal) may be actuated.

It will be seen that according to the present invention apparatus has been provided for sensing and indicating the edge position of a web being fed to a machine for acting thereon, which apparatus is simple and effective. While the invention has been herein illustrated and described in what are presently conceived to be the most practical and preferred embodiments, it will be obvious to one of ordinary skill in the art that many modifications may be made thereof within the scope of the invention, thus it is intended that the invention be given the broadest interpretation of the appended claims so as to encompass all equivalent structures and devices.

What is claimed is:

1. Apparatus for sensing and indicating the edge position of a web, having a pair of side edges, being fed in a path of movement in a given direction to a machine for acting on said web, said apparatus comprising:
   means for continuously physically contacting a single side edge of said web to sense the physical position of said single edge relative to a reference point that is stationary with respect to said machine,
   means for transforming said physical position sensing of said single web edge to a direct current electrical signal of a given voltage, the voltage of said signal being dependent upon the relative position of said single edge to said stationary reference point, each relative position of said single web edge having a signal of a different voltage associated therewith,
   means for comparing the given voltage of said electrical signal to a reference direct current voltage,
   three visual indicating means, each for visually indicating the position of said web edge relative to said stationary reference point when said edge is within a given distance range from said stationary reference point, and
   means for selectively energizing one of said three visual indicating means dependent upon the given voltage of said electrical signal relative to said reference voltage, said means comprising a pair of switching amplifiers, a triple exclusive OR gate having inputs and an output for each gate thereof, each gate input being operatively associated with said switching amplifiers, and a transistor connected in series with each gate output of said triple exclusive OR gate.

2. Apparatus as recited in claim 1 further comprising means for allowing adjustment of said reference voltage to a given value or values depending upon the range of edge movement desired for the energization of each of said three indicating means.

3. Apparatus as recited in claim 2 wherein said adjusting means comprises a pair of potentiometers.

4. Apparatus as recited in claim 3 wherein said transforming means comprises a linear variable differential transformer, and wherein said voltage comparing means comprises a pair of differential voltage comparators, said linear variable differential transformer having an electrical signal conducting line extending therefrom, said line being connected to an input of each of said voltage comparators, and each of said potentiometers being connected to a constant voltage source and an input of said voltage comparator.

5. Apparatus as recited in claim 1 wherein said transforming means comprises a linear variable differential transformer.

6. Apparatus as recited in claim 1 wherein said voltage comparing means comprises a pair of differential voltage comparators.

7. Apparatus as recited in claim 6 wherein said transforming means comprises a linear variable differential transformer having an electrical signal conducting line extending therefrom, said line connected to an input of each of said differential voltage comparators.

8. Apparatus as recited in claim 1 wherein each of said transistors is connected to a source of constant voltage in series with a light emitting diode.

9. Apparatus for sensing the physical position of an edge of a web travelling in a given direction to a machine for acting on said web, the physical position sensed being relative to a stationary point with respect to said machine, said apparatus comprising:
   a. means for physically contacting said edge of said web, said contacting means comprising an elongated body member having a tip of hard, wear-resistant material, said tip actually engaging said web edge;
   b. means for normally biasing said contacting means into physical contact with said web;
   c. first mounting means for mounting said edge contacting means for only straight-line movement in a direction generally perpendicular to the direction of movement of said web in response to the web edge position, said first mounting means comprising a bore in a first bracket body member, said bore conforming generally in shape to the shape of said contacting means body member;
   d. a linear variable differential transformer;
   e. second mounting means for mounting said linear variable differential transformer so that it is not subject to side forces but so that it is responsive to the linear movement of said web edge contact means and generates an electrical signal in response thereto, and said second mounting means comprising a second bore in said first bracket body member in line with said first bore, said second bore adapted to receive said linear variable differential transformer therein for operative connection to said web edge contacting means;
   f. third mounting means for mounting said first mounting means to a stationary reference point associated with said machine; and
   g. means for providing adjustment of the position of said first mounting means relative to said stationary reference point.

10. Apparatus as recited in claim 9 wherein said web is a metal web and wherein said machine comprises a die-cutter for cutting said web into sheets adapted to be formed into metal cans.

11. Apparatus for sensing the physical position of an edge of the web travelling in a given direction to a machine for acting on said web, the physical position sensed being relative to a stationary point with respect to said machine, said apparatus comprising:
   a. means for physically contacting said edge of said web;
   b. means for normally biasing said contacting means into physical contact with said web;
   c. first mounting means for mounting said edge contacting means for only straight-line movement in a direction generally perpendicular to the direction of movement of said web in response to the web edge position, said first mounting means including a first bracket body member;
   d. a linear variable differential transformer;
   e. second mounting means for mounting said linear variable differential transformer so that it is not subject to side forces but so that it is responsive to the linear movement of said web edge contact means and generates an electrical signal in response thereto;

f. third mounting means for mounting said first mounting means to a stationary reference point associated with said machine, said third mounting means including a second bracket body member; and g. means for providing adjustment of the position of said first mounting means relative to said stationary reference point, said means including a guide pin extending through openings in said first bracket body member and second bracket body member whereby the relative position between said first bracket body member and said second bracket body member may be changed along a guided path.

12. Apparatus as recited in claim 11 wherein said adjustment providing means further includes a screw passing through an elongated opening in said second bracket body member into a screw-threaded opening in said first bracket body member.

13. Apparatus as recited in claim 11 further comprising:

means for comparing the relative voltage of said electrical signal produced by said linear variable differential transformer to a reference d.c. voltage, said means being remote from said stationary reference point, three visual indicating means, each visually indicating the position of said web edge relative to said stationary reference point when said edge is within given distance range from said stationary reference point, said means being remote from said stationary reference point and said voltage comparing means, and means for selectively energizing one of said three visual indicating means dependent upon the relative voltage of said electrical signal with respect to said reference voltage.

14. Apparatus for sensing and indicating the edge position of a web, having a pair or side edges, being fed in a path of movement in a given direction to a machine for acting on said web, said apparatus comprising:

means for continuously physically contacting a single side edge of said web to sense the physical position of said single edge relative to a reference point that is stationary with respect to said machine.

means for transforming said physical position sensing of said single web edge to a direct current electrical signal of a given voltage, the voltage of said signal being dependent upon the relative position of said single edge to said stationary reference point, each relative position of said single web edge having a signal of a different voltage associated therewith, said means comprising a linear variable differential transformer, means for comparing the given voltage of said electrical signal to a reference direct current voltage, said means comprising a pair of differential voltage comparators, said linear variable differential transformer having an electrical signal conducting line extending therefrom, said line being connected to an input of each of said voltage comparators, three visual indicating means, each for visually indicating the position of said web edge relative to said stationary reference point when said edge is within a given distance range from said stationary reference point, and means for selectively energizing one of said three visual indicating means dependent upon the given voltage of said electrical signal relative to said reference voltage, said means comprising a pair of switching amplifiers, one connected to an output of each of said differential voltage comparators, a triple exclusive OR gate operatively connected to said switching amplifiers, and a transistor connected in series with an output of each gate of said triple exclusive OR gate, and means for allowing adjustment of a reference voltage to a given value or values depending upon the range of edge movement desired for the energization of each of said three indicating means, said adjusting means comprises a pair of potentiometers, and each of said potentiometers being connected to a constant voltage source and an input of said voltage comparator.

* * * * *